UNITED STATES PATENT OFFICE 1,965,776

MANUFACTURE OF SULPHIDES OF NITRO-AMINODIPHENYL OR SUBSTITUTION PRODUCTS THEREOF

Robert Lantz, Paris, France, assignor of one-half to Société Anonyme Des Matieres Colorantes & Produits Chimiques De Saint-Denis, Paris, France No Drawing. Application July 20, 1931, Serial No. 552,067. In France August 8, 1930

24 Claims. (Cl. 260—109)

This invention relates to the manufacture of sulphides of nitroaminodiphenyl or substitution products thereof, which are represented by the following general formula

in which the benzene nuclei R, $R_1$ may or may not contain substituents.

The manufacture consists in causing 1:2— or 1:4— chloronitrobenzene or a substitution product thereof to react with sodium sulphide to produce an aminothiophenol according to the process described in my French patent application No. 299,805, filed August 1, 1930, and treating this aminothiophenol with 1:2— or 1:4—chloronitrobenzene, or a substitution product thereof, which substitution product may be identical with that (if any) used in the first instance or different therefrom. There is thus formed a condensation product of aminothiophenol in chloronitrobenzene, namely a sulphide or a nitroaminodiphenyl. The following equation expresses the reactions for the simplest case, in which the benzene nuclei do not contain substituents:

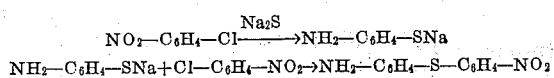

It is advantageous to use in the first phase of the reaction a proportion of sulphur about that theoretically necessary for the transformation of the chloronitrobenzene into aminothiophenol, namely 2.5 molecules per molecule of the parent material. In most cases the chloronitrobenzene used in the second phase can be added directly to the liquid containing the product of the first phase, without separating the last-named product. The final product is thus obtained in a particularly simple and economical manner. In most cases the reaction may be conducted in aqueous medium without use of any other solvent.

The invention permits easy manufacture of bodies which can otherwise be obtained only with difficulty.

A number of new products has been made very easily by the process of the invention, the yields being generally good.

In the examples which are here given by way of illustrating the invention sodium sulphide is used but soluble sulphides of other metals are also applicable. Furthermore, a part of the sodium sulphide may be exchanged for the hydrosulphide or for a solution of sulphur in sodium sulphide.

*Example 1.*—A solution of 492 grams of crystallized sodium sulphide in 1230 cc. of water, to which has been added 123 grams of para-chloronitrobenzene, is boiled for 7 hours. After cooling, a saturated solution of zinc sulphate is added until a drop removed from the liquid produces only a pale rose colour on paper dyed with brilliant orange. The white precipitate thus obtained is filtered and redissolved in about 3 litres of hot water and 400 cc. of hydrochloric acid. The whole is filtered at about the boiling point and then 100 grams of crystallized zinc sulphate and 900 grams of salt are added to the filtrate. The zinc compound of 4-aminothiophenol is thus precipitated in crystalline state.

9.25 grams of this dry compound are introduced, together with 7.9 grams of para-chloronitrobenzene into a solution consisting of 100 cc. of water and 10 cc. of caustic soda solution of 40° Bé. The whole is heated to boiling for about 4 hours. After removing the excess of cholornitrobenzene by a current of steam, the mixture is filtered. The crystalline product thus obtained is nearly pure sulphide of 4-nitro-4'-aminodiphenyl. The yield is very good.

*Example 2.*—A solution of 600 grams of crystallized sodium sulphide in 2500 cc. of water, to which 160 grams of 1-chloro-4-nitrobenzene have been added, is boiled for about 10 hours. A current of steam is then passed into the mixture until nothing further is entrained thereby, and then there are added another 160 grams of 1-chloro-4-nitrobenzene and the boiling is continued for about 15 hours. The excess of chloronitrobenzene is removed by a current of steam. The crystalline product which has been formed is filtered. It is very nearly pure sulphide of 4-nitro-4'-aminodiphenyl. It may be recrystallized from alcohol. The yield is almost theoretical.

In the second phase of the reaction there may be substituted for the 1-chloro-4-nitrobenzene, the 1-chloro-2-nitrobenzene or 1,4-dichloronitrobenzene, or 1-chloro-4-nitro-2 benzene-sulphonic acid, 1-chloro-2-nitro-4-benzene-sulphonic acid or 1-chloro-4-nitro-2-benzene-carboxylic acid, or 1-chloro-2,4-dinitro-benzene or the like.

In analogous manner there may be used in the first phase of the reaction 1-chloro-2-nitrobenzene, 1,4-dichloro-2-nitrobenzene, 1-chloro-4-nitro-2-benzene-sulphonic acid or the like.

In the following examples some of these reactions are illustrated.

*Example 3.*—A solution of 110 grams of sodium sulphide in 440 grams of water, to which has been added 27.3 grams of para-chloronitrobenzene, is boiled for 7 hours. After passage of a current of steam and cooling, there is added in small doses a solution of 32.3 grams of 1-chloro-2,4-dinitrobenzene in 350 cc. of alcohol. There is produced rapidly a precipitate of orange coloured needles consisting of the sulphide of 4-amino-2', 4'-dinitrodiphenyl.

*Example 4.*—There is boiled for about 10 hours a mixture of 123 grams of ortho-chloronitrobenzene and a solution of 492 grams of crystallized sodium sulphide in 2260 cc. of water. The small quantity of chloraniline which is formed is then removed by steam and the whole is filtered. After having brought the filtrate to the initial volume, there are added 196 grams of the sodium salt of 1-chloro-4-nitro-2-benzene sulphonic acid. After boiling for 3 hours the product is salted out by addition of 20 per cent of common salt. It is filtered cold on the next day. This product is the crude sodium salt of 4'-nitro-2-amino-diphenylsulphide-2'-sulphonic acid.

The crystallized free acid is made by dissolving the sodium salt in water, filtering and precipitating by means of hydrochloric acid. The greenish yellow precipitate consists of groups in tufts of needles. It is washed with fresh water and dried. It may be recrystallized from water.

*Example 5.*—A solution of 164 grams of crystallized sodium sulphide in 30820 cc. of water containing 62.1 grams of the sodium para-nitrochlorobenzene-ortho-sulphonate, is boiled for 5 hours and there are then added 40 grams of parachloronitrobenzene and the boiling is continued for 14 hours. The excess of chloronitrobenzene is removed by steam. On cooling, there is formed a precipitate of sodium 4-nitro-4'-aminodiphenylsulphide-2'-sulphonate. The mother liquor yields a considerable further quantity by salting out. The free acid may be obtained in the crystalline state as described in Example 4.

*Example 6.*—A mixture of 7.85 grams of parachloronitrobenzene, 1.6 grams of sulphur and a solution of 24 grams of crystalline sodium sulphide in 75 cc. of water is boiled for 5 hours. After filtering there are added 3.75 cc. of a caustic soda solution of 40° Bé. and then 7.85 grams of chloronitrobenzene, and the whole is boiled again for 4 hours. The unaltered chloronitrobenzene is removed by steam and filtered. A product consisting of the sulphide of 4-nitro-4'-aminodiphenyl is obtained.

Good results are also obtained if in this example there is substituted for the 24 grams of crystallized sodium sulphide 12 grams of crystallized sodium sulphide and for the sulphur 3.4 grams of sodium hydrosulphide.

There is appended hereto a table which indicates the characteristics of a certain number of products, for the most part new, which have been manufactured in accordance with this invention.

TABLE

Product No. 1

Compound used in the first phase: 1-chloro-4-nitrobenzene
Compound used in the second phase: 1-chloro-4-nitrobenzene
Formula:

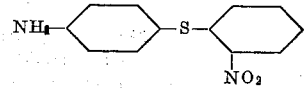

Appearance: Yellow leaflets
Solvent used for crystallization: Alcohol
Melting point: 143° C.
Colors developed by naphthol: Red, insoluble

Product No. 2

Compound used in the first phase: 1-chloro-4-nitrobenzene
Compound used in the second phase: 1-chloro-2-nitrobenzene
Formula:

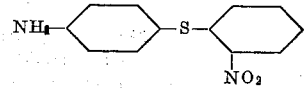

Appearance: Greenish yellow leaflets
Solvent used for crystallization: Alcohol
Melting point: 103° C.
Colors developed by naphthol: Orange red insoluble
Sulphur % {calculated: 13 / found: 12.58}
Diazotizable nitrogen % {calculated: 5.69 / found: 5.51}
Kjeldahl nitrogen % {calculated: 11.38 / found: 11.1}

Product No. 3

Compound used in the first phase: 1-chloro-4-nitrobenzene
Compound used in the second phase: 1-chloro-2-nitro-4 benzenesulphonic acid
Formula:

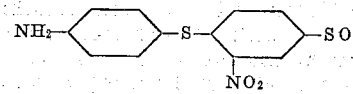

Appearance: Sodium salt: orange yellow needles and prisms
Solvent used for crystallization: Aqueous alcohol
Colors developed by naphthol: Orange red slightly soluble
Sulphur % {calculated: 18.4 / found: 18.28}
Diazotizable nitrogen % {calculated: 4.02 / found: 4.15}

Product No. 4

Compound used in the first phase: 1-chloro-4-nitrobenzene
Compound used in the second phase: 1-chloro-4 nitro 2-benzene-sulphonic acid
Formula:

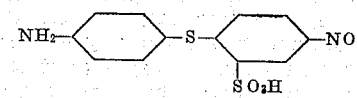

Appearance: Free acid: yellow needles
Solvent used for crystallization: Aqueous acetic acid
Colors developed by naphthol: Orange red slightly soluble
Sulphur % {calculated: 19.65 / found: 19.62}
Diazotizable nitrogen % {calculated: 4.29 / found: 4.25}

Product No. 5

Compound used in the first phase: 1-chloro-4-nitrobenzene
Compound used in the second phase: 1-chloro-2,4 dinitrobenzene
Formula:

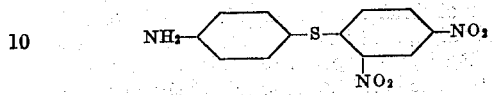

Appearance: orange needles
Solvent used for crystallization: benzene
Melting point: 168.5° C.
Colors developed by naphthol: orange red insoluble Sulphur % {calculated: 11 / found: 10.3}

Diazotizable nitrogen % {calculated: 4.80 / found: 4.68}

Product No. 6

Compound used in the first phase: 1-chloro-4 nitrobenzene
Compound used in the second phase: 1-chloro-4 nitro-2 benzoic acid
Formula:

Appearance: free acid: yellow crystals
Solvent used for crystallization: sodium salt: hot water
Melting point: with decomposition to about 215–216° C.
Colors developed by naphthol: orange yellow slightly soluble.

Sulphur % {calculated: 11.05 / found: 10.85}

Diazotizable nitrogen % {calculated: 4.82 / found: 4.74}

Product No. 7

Compound used in the first phase: 1-chloro-4 nitrobenzene
Compound used in the second phase: 1,4 dichloro-2 nitrobenzene
Formula:

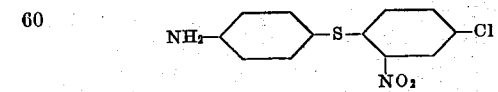

Appearance: yellow laminæ
Solvent used for crystallization: alcohol
Melting point: 133° C.
Colors developed by naphthol: red orange insoluble Sulphur % {calculated: 11.42 / found: 11.42}

Diazotizable nitrogen % {calculated: 4.98 / found: 4.70}

Product No. 8

Compound used in the first phase: 1-chloro-2-nitrobenzene
Compound used in the second phase: 1 chloro-4 nitrobenzene
Formula:

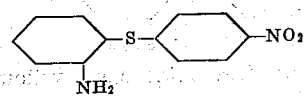

Appearance: yellow prisms
Solvent used for crystallization: alcohol
Melting point: 87.4° C.
Colors developed by naphthol: red orange insoluble Sulphur % {calculated: 13 / found: 12.41}

Diazotizable nitrogen % {calculated: 5.69 / found: 5.54}

Kjeldahl nitrogen % {calculated: 11.38 / found: 10.85}

Product No. 9

Compound used in the first phase: 1-chloro-2-nitrobenzene
Compound used in the second phase: 1-chloro-2-nitrobenzene
Formula:

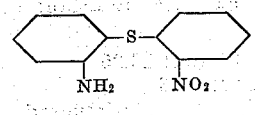

Appearance: large yellow leaflets
Solvent used for crystallization: alcohol
Melting point: 85.4° C.
Colors developed by naphthol: orange yellow insoluble Sulphur % {calculated: 13 / found: 12.8}

Diazotizable nitrogen % {calculated 5.69 / found: 5.6}

Product No. 10

Compound used in the first phase: 1-chloro-2-nitrobenzene
Compound used in the second phase: 1-chloro-2-nitro-4-benzenesulphonic acid
Formula:

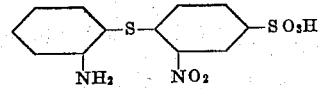

Appearance: sodium salt: orange yellow leaflets
Solvent used for crystallization: hot water
Colors developed by naphthol: orange yellow soluble Sulphur % {calculated: 18.4 / found: 18.05}

Diazotizable nitrogen % {calculated: 4.02 / found: 4.08}

Product No. 11

Compound used in the first phase: 1-chloro-2-nitrobenzene
Compound used in the second phase: 1-chloro-4 nitro-2-benzene sulphonic acid
Formula:

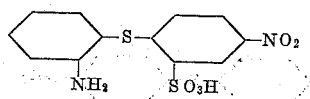

Appearance: Free acid: clear yellow crystalline masses
Solvent used for crystallization: hot water
Colors developed by naphthol: orange yellow slightly soluble Sulphur % {calculated: 19.65
found: 19.42

Diazotizable nitrogen % {calculated: 4.29
found: 4.2

Product No. 12

Compound used in the first phase: 1-chloro-2-nitrobenzene
Compound used in the second phase: 1-chloro-4-nitro 2-benzoic-acid
Formula:

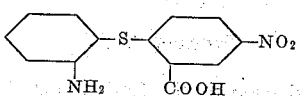

Appearance: sodium salt: orange
Solvent used for crystallization: hot water
Melting point of the acid: about 243° C., with decomposition
Colors developed by naphthol: orange yellow slightly soluble Sulphur % {calculated: 10.25
found: 9.86

Diazotizable nitrogen % {calculated: 4.48
found: 4.3

Product No. 13

Compound used in the first phase: 1-chloro-4 nitro-2 benzene sulphonic acid
Compound used in the second phase: 1-chloro-4 nitrobenzene
Formula:

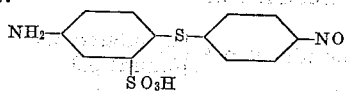

Appearance: Free acid: green-gray leaflets
Solvent used for crystallization: sodium salt: hot water
Colors developed by naphthol: dull red slightly soluble Sulphur % {calculated: 19.65
found: 19.1

Product No. 14

Compound used in the first phase: 1,4-dichloro-2 nitrobenzene
Compound used in the second phase: 1,4 dichloro-2 nitrobenzene
Formula:

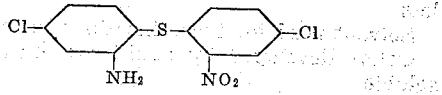

Appearance: Large brown prisms
Solvent used for crystallization: alcohol
Melting point: 139° C.
Colors developed by naphthol:—

Sulphur % {calculated: 10.15
found: 10.3

What I claim is:

1. A method of preparing nitro-amino derivatives of diphenyl thio ethers, in which the nitro and amino groups are attached to different nuclei and have, in their respective nuclei, any position but the meta-position in relation to the sulphur, which comprises causing a chloronitrobenzene, with the exception of meta-chloronitrobenzene, to react with a neutral soluble salt of hydrogen sulphide, and then causing a chloronitrobenzene with the exception of meta-chloronitrobenzene, to react on the product of the first reaction.

2. A method of preparing sulphides of nitroaminodiphenyl according to claim 1 wherein the reactions are conducted in an aqueous medium.

3. A method of preparing sulphides of nitroaminodiphenyl according to claim 1 in which the portion of the neutral soluble sulphide is replaced by the corresponding disulphide.

4. A method of preparing sulphides of nitroaminodiphenyl according to claim 1 in which the portion of the neutral soluble sulphide is replaced by the corresponding hydrosulphide.

5. A method of preparing nitro-amino derivatives of diphenyl thio ethers, in which the nitro and amino groups are attached to different nuclei and have, in their respective nuclei, any position but the meta-position in relation to the sulphur, which comprises causing a chloronitrobenzene, with the exception of meta-chloronitrobenzene, to react with a neutral soluble salt of hydrogen sulphide, and then causing a substitution product of chloronitrobenzene, other than meta-chloronitrobenzene, to react on the product of the first reaction.

6. A method of preparing nucleal substitution product of sulphides of nitroaminodiphenyl according to claim 5 in which the reactions are conducted in an aqueous medium.

7. A method of preparing nucleal substitution products of sulphides of nitroaminodiphenyl according to claim 5 in which the portion of the neutral soluble sulphide is replaced by the corresponding disulphide.

8. A method of preparing nucleal substitution products of sulphides of nitroamino diphenyl according to claim 5 in which the portion of the neutral soluble sulphide is replaced by the corresponding hydrosulphide.

9. A method of preparing nitroamino derivatives of diphenyl thio ethers, in which the nitro and amino groups are attached to different nuclei and have, in their respective nuclei, any position but the meta-position in relation to the sulphur, which comprises causing a nucleal substitution product of chloronitrobenzene, other than meta-chloronitrobenzene, to react with a neutral soluble salt of hydrogen sulphide and then causing a chloronitrobenzene, other than meta-chloronitrobenzene, to react on the product of the first reaction.

10. A method of preparing substitution products of sulphides of nitroaminodiphenyl according to claim 9 in which the reactions are conducted in an aqueous medium.

11. A method of preparing nucleal substitution products of sulphides of nitroaminodiphenyl according to claim 9 in which the portion of the neutral soluble sulphide is replaced by the corresponding disulphide.

12. A method of preparing nucleal substitution products of sulphides of nitroaminodiphenyl according to claim 9 in which the portion of neutral soluble sulphide is replaced by the corresponding hydrosulphide.

13. A method of preparing nitroamino derivatives of diphenyl thio ethers, in which the nitro and amino groups are attached to different nuclei and have, in their respective nuclei, any position but the meta-position in relation to the sulphur, which comprises causing a nucleal substitution product of chloronitrobenzene, other than para-chloronitrobenzene, to react on the neutral soluble salt of hydrogen sulphide and then causing the substitution product of chloronitrobenzene, other than meta-chloronitrobenzene, to react on the product of the first reaction.

14. A method of preparing a nucleal substitution product according to claim 13 in which the reactions are conducted in an aqueous medium.

15. A method of preparing a nucleal substitution product of sulphides of nitroaminodiphenyl according to claim 13 in which the portion of the neutral soluble sulphide is replaced by the corresponding disulphide.

16. A method of preparing a nucleal substitution product of sulphides of nitroaminodiphenyl according to claim 13 in which the portion of the neutral soluble sulphide is replaced by the corresponding hydrosulphide.

17. A method of preparing sulphides of nitroaminodiphenyl, according to claim 1 in which the second reaction is conducted in the liquid in which the first reaction has been produced without separating the product of the last named reaction.

18. A method of preparing nucleal substitution products of sulphides of nitroaminodiphenyl according to claim 5 in which the second reaction is conducted in the liquid in which the first reaction has been produced without separating the product of the last named reaction.

19. A method of preparing nucleal substitution products of sulphides of nitroaminodiphenyl according to claim 9 in which the second reaction is conducted in the liquid in which the first reaction has been produced without separating the product of the last named reaction.

20. A method of preparing a nucleal substitution product of sulphides of nitroaminodiphenyl according to claim 13 in which the second reaction is conducted in the liquid in which the first reaction has been produced without separating the product of the last named reaction.

21. A body whose formula is

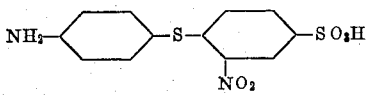

whose sodium salt has the appearance of orange yellow needles and prisms, adapted to be dissolved for crystallization in aqueous alcohol, and adapted to give a slightly soluble orange red dye with naphthol.

22. A body whose formula is

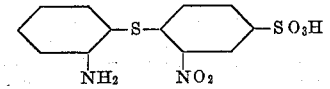

whose sodium salt has the appearance of orange yellow leaflets, adapted to be dissolved for crystallization in hot water, adapted to give a slightly soluble orange dye with naphthol.

23. A body whose formula is

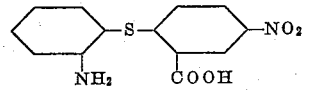

whose sodium salt is orange, adapted to be dissolved for crystallization in hot water, adapted to give a slightly soluble orange dye with naphthol, said body melting with decomposition at a temperature about 243° C.

24. A sulphide of nitroaminodiphenyl in which the nitro group and the amino group are attached to different nuclei in any position but the meta position in relation to the sulphur, said sulphide further consisting of a salt forming acid radical selected from the group consisting of COOH and SO$_3$H.

ROBERT LANTZ.